US012805532B2

(12) United States Patent
Tanaka

(10) Patent No.: US 12,805,532 B2
(45) Date of Patent: Nov. 24, 2026

(54) AUTOMATED VERTICAL TRANSPORT

(71) Applicant: Lab2Fab, LLC, Fremont, CA (US)

(72) Inventor: Samuel Tanaka, San Leandro, CA (US)

(73) Assignee: Lab2Fab, LLC, Fremont, CA (US)

( * ) Notice: Subject to any disclaimer, the term of this patent is extended or adjusted under 35 U.S.C. 154(b) by 145 days.

(21) Appl. No.: 18/899,145

(22) Filed: Sep. 27, 2024

(65) Prior Publication Data

US 2025/0107537 A1 Apr. 3, 2025

Related U.S. Application Data

(60) Provisional application No. 63/631,441, filed on Apr. 8, 2024, provisional application No. 63/541,125, filed on Sep. 28, 2023.

(51) Int. Cl.

| | |
|---|---|
| ***A21C 13/02*** | (2006.01) |
| ***A21C 9/08*** | (2006.01) |
| ***A21C 13/00*** | (2006.01) |
| ***B65G 33/06*** | (2006.01) |
| ***B65G 47/57*** | (2006.01) |

(52) U.S. Cl.

CPC .............. *A21C 13/02* (2013.01); *A21C 9/083* (2013.01); *A21C 13/00* (2013.01); *B65G 33/06* (2013.01); *B65G 47/57* (2013.01); *B65G 2201/0202* (2013.01); *B65G 2201/0258* (2013.01)

(58) Field of Classification Search

CPC ......... A21C 9/081; A21C 9/083; A21C 13/00; A21C 13/02; B65G 33/06; B65G 47/57; B65G 2201/0202; B65G 2201/0258; B65G 2207/24; B65G 2207/44

See application file for complete search history.

(56) References Cited

U.S. PATENT DOCUMENTS

| | | | | |
|---|---|---|---|---|
| RE4,792 E * | 3/1872 | Smith | 34/189 | |
| 2,897,772 A * | 8/1959 | Hunter | A21B 5/08 | 425/287 |
| 3,018,742 A * | 1/1962 | Ward | A21B 1/26 | 432/87 |

(Continued)

FOREIGN PATENT DOCUMENTS

| | | |
|---|---|---|
| CA | 2546878 A1 | 11/2006 |
| DE | 198761 C | 5/1908 |
| EP | 0725959 B1 | 1/1998 |

OTHER PUBLICATIONS

International Search Report and Written Opinion for Application No. PCT/US2024/049101 dated Dec. 18, 2024 (10 pages).

*Primary Examiner* — Gene O Crawford
*Assistant Examiner* — Keith R Campbell
(74) *Attorney, Agent, or Firm* — Van Hoven PC; Jeremy Plenzler; Joshua Van Hoven

(57) ABSTRACT

A vertical transport comprises a first rotatable element having a first support surface extending about a first axis. The vertical transport further includes a second rotatable element having a second support surface extending about a second axis spaced from the first axis. The first and second rotatable elements are configured to move a pan engaged with the first and second support surfaces in a vertical direction by rotating the first and second rotatable elements. In some examples a vertical transport is incorporated within a proofing enclosure or other storage for food items.

17 Claims, 8 Drawing Sheets

(56) References Cited

U.S. PATENT DOCUMENTS

| | | | | | |
|---|---|---|---|---|---|
| 3,864,846 | A * | 2/1975 | Hayashi | A23B 2/82 | 34/189 |
| 4,077,528 | A * | 3/1978 | Santen | A23B 2/001 | 34/189 |
| 5,203,256 | A * | 4/1993 | Mueller | A21C 13/02 | 99/476 |
| 5,473,978 | A * | 12/1995 | Colombo | B65G 17/123 | 99/477 |
| 6,098,379 | A * | 8/2000 | Spatafora | B65B 35/04 | 53/448 |
| 9,440,795 | B2 * | 9/2016 | Mackay | H05B 6/782 | |
| 11,827,457 | B2 * | 11/2023 | Du Bois | A47G 19/08 | |
| 2014/0083820 | A1 | 3/2014 | Mackay | | |
| 2023/0019050 | A1 * | 1/2023 | Verouden | A21C 13/02 | |

* cited by examiner

AUTOMATED VERTICAL TRANSPORT

CROSS-REFERENCE TO RELATED APPLICATIONS

This application claims the benefit of U.S. Provisional Patent Application No. 63/541,125 filed Sep. 28, 2023 and of U.S. Provisional Patent Application No. 63/631,441 filed Apr. 8, 2024, and the disclosures of each are hereby incorporated by reference herein in their entireties for all purposes.

INTRODUCTION

The present disclosure is directed to a transport device, and more particularly, to a transport device for food items in an automated food system.

BACKGROUND

Yeast in a pizza dough or other bread products may be activated prior to baking in a process called proofing. Generally, proofing involves placing the dough in an oven or other enclosure at a desired temperature for a period of time. The proofing process generally occurs within an environmentally controlled cabinet before assembly and baking of the pizza. In some cases, pizza dough is kept at room temperature or slightly above, e.g., at 100 degrees Fahrenheit, for a period of several hours. During proofing, dough may generally rise.

Systems have been developed for automated production of pizza and other food products. Merely as examples, automated pizza production systems and methods are known from U.S. Provisional Patent Application No. 62/819,326 (filed on Mar. 15, 2019), U.S. patent application Ser. No. 16/780,797 (filed on Feb. 3, 2020), U.S. patent application Ser. No. 17/885,093 (filed on Aug. 10, 2022), and U.S. patent application Ser. No. 17/885,104 (filed on Aug. 10, 2022), each of which are hereby incorporated by reference in their entireties for all purposes. Accordingly, it is desired to enhance existing automated pizza production systems and methods by automating the production and/or dispensing of pizza dough or other bread products.

SUMMARY

In at least some example approaches, a system for proofing dough comprises a first rotatable element having a first support surface extending about a first axis. The system also comprises a second rotatable element having a second support surface extending about a second axis spaced from the first axis. The first and second rotatable elements are configured to move a pan engaged with the first and second support surfaces by rotating the first and second rotatable elements. The system further includes a cabinet having a temperature-controlled enclosure containing the first rotatable element and second rotatable element. The cabinet is configured to proof dough on the pan by maintaining a predetermined temperature, thereby exposing the dough to the predetermined temperature within the enclosure for a predetermined period of time.

In at least some examples, a vertical transport comprises a first rotatable element having a first support surface extending about a first axis. The vertical transport further includes a second rotatable element having a second support surface extending about a second axis spaced from the first axis. The first and second rotatable elements are configured to move a pan engaged with the first and second support surfaces in a vertical direction by rotating the first and second rotatable elements.

In at least some example illustrations, a method for transporting dough through a proofing enclosure comprises providing a first rotatable element and a second rotatable element. The first rotatable element includes a first pan support surface extending about a first axis, and the second rotatable element includes a second pan support surface extending about a second axis spaced from the first axis. The method also includes rotating the first and second rotatable elements, thereby moving a pan engaged with the first and second pan support surfaces through the enclosure.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Figure 1:
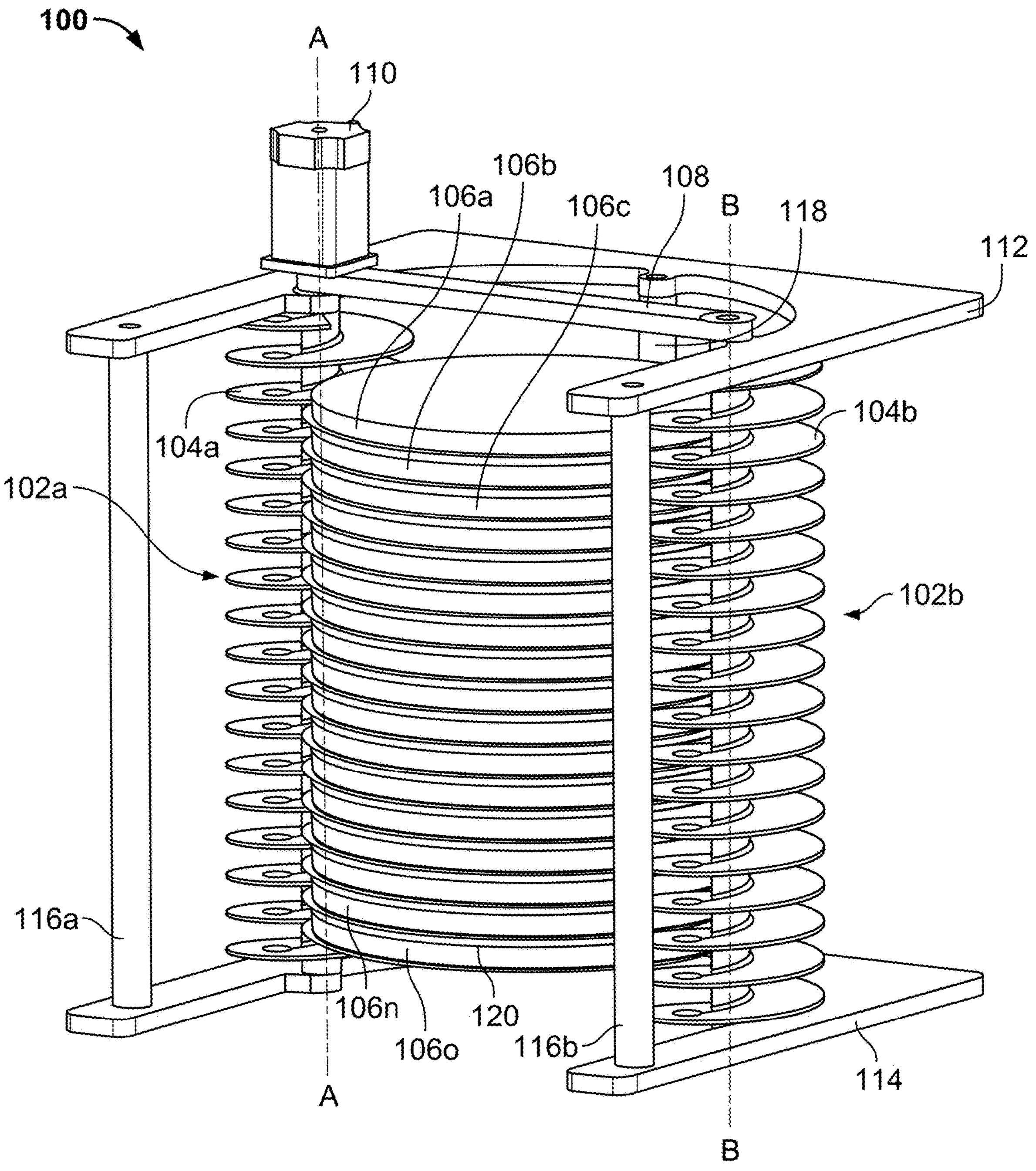
FIG. 1 depicts a perspective view of a vertical transport, in accordance with some embodiments of the disclosure.

Generally, example illustrations herein are directed to systems and methods for vertically transporting one or more pans or other relatively flat objects. In at least some examples, pans or objects are configured to have a pizza dough or other bread product thereon. In at least some of these examples, the vertical transport may be employed in a proofing enclosure or other storage for a pizza dough, bread dough, or other food item. For example, dough on each pan may be exposed to a desired temperature, humidity, pressure, and/or other conditions for a desired period of time to facilitate proofing of the dough. The vertical transport may dispense each pan or dough sequentially, e.g., in response to a demand for a pizza dough by way of orders received via an automated food system, or in response to a determination that one or more of the doughs within an enclosure have been proofed for a desired period of time.

In at least some examples, a vertical transport mechanism employs two rotatable elements. The rotatable elements may each comprise a helix, spiral, screw, or other pitched surface generated about a linear axis. Pans or other objects may rest upon these support surfaces. As such, the rotatable elements may transport one or more pans vertically through the enclosure by rotating about their respective axes. As the rotatable elements turn, the pan(s) may slide along the pitched surface, thereby descending or ascending depending on the direction of rotation of the rotatable elements. Further, the rotatable elements or helixes may also serve as a rack for the plurality of pans. Rotation of the helixes may cause the pans to be dispensed from the enclosure and/or onto a conveyor such as a belt, moving platform, or a robotic arm, which may then transport the pan and/or dough away from the enclosure (e.g., to a sauce or topping dispensing module or station).

Any rotatable element may be employed that is suitably adapted to reliably support and move the pan and/or dough. In the illustrated examples discussed below, two rotatable helixes are employed, with each positioned on opposite sides of pan(s) or other flat objects. An example helix may include a support surface extending in a spiral around an axis of rotation of the helix/rotatable element. Accordingly, rotation of the rotatable elements raises or lowers the pan vertically through the enclosure. A pitch of the helix may space the individual pizza pans apart at a desired distance (e.g., to provide support for each pan while accommodating the enclosure environment), with each of the pans being raised or lowered as a result of the rotation of the rotatable elements.

Generally, the two rotatable elements/helixes may turn in unison, thereby moving pans or other objects up or down within the enclosure. For example, a force translating component such as a belt, chain, or the like extending about an end of both rotatable elements may facilitate synchronized rotation of the rotatable elements. In the event that a motion of one or more of the rotatable elements may be required to be at a different rate or direction, appropriate components (e.g., pulleys, gears, etc.) may be implemented such that a single drive can power all of the rotatable components, or in some examples multiple drive motors may be utilized and controlled independently. Pans may move through the enclosure along each helix, until the pan reaches an end and loses contact with the support surface of each of the rotatable elements. Pans may thereby be individually dispensed from the vertical transport. In some examples, dispensing a pan or other object from a vertical transport causes the pan to land on a conveyor or other device for laterally transporting the pan/dough away from the vertical transport and/or proofing enclosure. Merely as one example, the pans may be placed by the rotatable element on a moving belt or platform configured to move each pan out of the enclosure/cabinet. In another example, a transfer mechanism may be accessed by end-of-arm tooling of a multi-axis robotic arm, which removes each pan from the enclosure as they are dropped from or otherwise located by the rotatable elements. Moreover, in some examples multiple vertical transports may be provided in a corresponding number of storage or proofing cabinets that may collectively serve as a storage and/or proofing system for a larger number of doughs or other food items.

Referring now to FIG. 1, an example vertical transport 100 is illustrated and described in further detail. The vertical transport 100 may be utilized for storing and/or moving objects, such as pans 106. In some examples, the vertical transport 100 may be provided within an environmentally-controlled enclosure, e.g., to expose objects within to a desired temperature, humidity, and/or pressure, etc. over a desired period of time. Generally, dough proofing is a process of allowing bread dough to rise, as may occur when yeast in the dough cats sugars and/or starches present in the dough, releasing carbon dioxide. A period of time for proofing a dough may be predetermined based upon an expected or controlled temperature maintained within a proofing or other environmentally-controlled enclosure for the vertical transport 100, and in at least some examples may generally range from a few minutes to a few hours. In the illustrated example, the pans 106 are relatively flat and are configured to support a pizza dough 120. As will be described further below, the vertical transport 100 may be employed in a system or device utilized for a bread proofing process, e.g., to expose the dough 120 to a temperature that is elevated above room temperature.

The vertical transport 100 includes a first rotatable element 102*a* configured to rotate about a first axis A-A. The first rotatable element 102*a* is spaced apart from a second rotatable element 102*b*, which rotates around a second axis B-B. The first rotatable element 102*a* and the second rotatable element 102*b* define a first support surface 104*a* and a second support surface 104*b*, respectively. In the illustrated example, the first support surface 104*a* and second support surface 104*b* each have a generally helical configuration. As shown in the illustrated example in FIG. 1, the helical configuration of the first and second support surfaces 104*a*, 104*b* are substantially identical, e.g., with generally matching tilt and/or pitch with respect to the axes A-A and B-B. In other examples, the rotatable elements are not identical, e.g., the pitch directions may be reversed, with the rotatable elements configured to rotate in opposite directions.

One or more pans 106 may be supported as illustrated in FIG. 1, with a first side of each pan 106 resting upon the support surface 104*a*, and an opposite side thereof on the opposite support surface 104*b*. As illustrated in FIG. 1, the support surfaces 104*a*, 104*b* are pitched such that fifteen (15) pans 106*a*-106*o* (collectively, 106) may be held simultaneously by the support surfaces 104*a*, 104*b*. Furthermore, rotation of the first and second rotatable elements 102*a*, 102*b* generally may move each pan 106 engaged with the support surfaces 104*a*, 104*b* vertically (e.g., down) along axes A-A and B-B. As will be described further below, rotation of the first and second rotatable elements 102*a*, 102*b* may cause the bottom pan 106*o* to eventually be dispensed downwardly as the pan 106*o* reaches terminal ends (not shown in FIG. 1) of the first and second support surfaces 104*a*, 104*b*, with further rotation next dispensing the next pan 106*n*, then pan 106*m*, etc., until all of the pans 106 have been dispensed. Furthermore, dispensing of the pans 106 from the vertical transport 100 may create capacity for additional pans 106 to be loaded into the vertical transport 100, e.g., by placing onto the support surfaces 104*a* and 104*b* at an upper end of the first and second rotatable elements 102*a* and 102*b*.

The helical shape of each of the rotatable elements 102 and/or support surfaces 104 noted above creates a continuous support surface 104 that extends in multiple turns about the axis A-A/B-B of the rotatable elements 102. Accordingly, as the pans 106 are lowered along the vertical transport 100, the pans 106 remain in contact with the support surfaces 104 on either side of the pan 106. The support surfaces 104 may, in at least some examples, be continuous from an upper end of the rotatable elements 102 to a lowermost or terminal edge, as will be discussed further below. The continuous support surfaces 104 may facilitate smooth vertical movement of the pans 106, as well as relatively easier cleaning and/or sterilization to the extent relatively fewer seams, gaps, or the like are created that might otherwise entrap food particles, grease, or the like.

Generally, although the support surfaces 104*a*, 104*b* are illustrated in a helical configuration, other configurations may be employed. Further, the helices may also have any desired pitch or tilt to provide a desired capacity for a number of pans 106, a desired speed of movement of the pans vertically based on a speed of rotation of the rotatable elements 102, etc. For example, as discussed below it may be desirable to contain the pans 106 and corresponding doughs 120 for a desired period of time within an enclosure of the vertical transport 100, e.g., to proof the doughs 120. Additionally, a groove length can also vary in order to provide a greater amount of space, e.g., to accommodate thicker pans or other objects onto the support surfaces 104*a*, 104*b*. A tilt angle of the first and second rotatable elements relative to vertical/upright may be zero, positive, or negative, as will be discussed further below. A helix defined by the first support surface 104*a* may be in the same direction or an opposite direction of the helix defined by the second support surface 104*b*, depending on a desired direction of rotation of the first and second rotatable elements 102*a*, 102*b*. Further, while the rotatable elements 102*a* and 102*b* are illustrated as being identical in FIG. 1, in other examples the first rotatable element 102*a* is not identical to rotatable element 102*b*, e.g., a tilt angle of the helices of the support surfaces 104*a* and 104*b* are different.

The rotatable elements 102*a*, 102*b* may be fabricated of a metal, plastic, composite, or any other suitable material. In examples where the rotatable elements 102*a*, 102*b* are used to vertically transport pizza dough or other consumable items, it may be desirable that the rotatable elements 102 and/or support surfaces 104 are coated with or formed entirely of a food-safe material that facilitates cleaning/sterilization, and also provides a relatively smooth surface to facilitate sliding of the pans 106 along the support surfaces 104*a* and 104*b*. Merely by way of example, the support surfaces 104*a*, 104*b* may be formed of a plastic material that is relatively smooth to reduce friction with respect to pans or objects, while also facilitating cleaning and/or sterilization. In some examples, the rotatable elements 102*a* and 102*b* and/or the support surfaces 104*a* and 104*b* are coated with or formed of materials such as Delrin, Nylon, Teflon, Ultra-High Molecular Weight (UHMW) Polyethylene, or any food-safe plastic material. Additionally, components such as the rotatable elements, supports, and/or other components of the vertical transport 100 may also be removable from a proofing enclosure or able to be quickly disassembled, thereby facilitating cleaning and/or sterilization, e.g., by washing in an automated dishwasher or the like. One or more cleaning or sterilizing devices may be positioned adjacent rotatable elements 102 and/or within an enclosure of the rotatable elements 102 and other components. Merely by way of example, an ultra-violet (UV) light may be positioned adjacent and/or along the rotatable element(s) 102, thereby facilitating sterilization of support surfaces 104 or other food-contacting components by activation of UV lighting during periods of non-use.

The first and second rotatable elements 102*a*, 102*b* may be driven in any manner that is convenient. For example, as shown in FIG. 1 a motor 110 may drive the first rotatable element 102*a*. A belt 108 couples rotation of the first and second rotatable elements 102*a*, 102*b*. In some examples, a belt 108 may synchronize rotation of the first and second rotatable elements 102*a*, 102*b*. Accordingly, in the example illustrated the motor 110 may drive rotation of both of the first rotatable element 102*a* and the second rotatable element 102*b*. The belt 108 may be a rubber belt, while in other example approaches the belt 108 is a metal chain. Further, in other examples the belt 108 may be driven directly by motor 110, thereby turning both of the rotatable elements 102*a* and 102*b*. Additionally, in other examples multiple motors 110 may be present, e.g., with a first motor 110 driving the first rotatable element 102*a* and a second motor 110 driving the second rotatable element 102*b*, in which case the belt 108 may not be needed.

A power source of the motor can be provided in any manner that is convenient (e.g., electricity) and the type of motor (e.g., DC, AC) can also be modified based on the specific vertical transport 100. One or more processors may be provided to control output(s) of the motor(s) 110 (e.g., torque, rotation rate, etc.). Furthermore, a location of the motor 110 is not restricted to the top of the rotatable elements as illustrated in FIG. 1, and can be provided in other locations (e.g., a bottom of one of the rotatable elements 102).

The first and second rotatable elements 102*a*, 102*b* may be fixed for rotation or otherwise supported in any manner that is convenient. For example, as illustrated in FIG. 1 an upper bracket 112 and a lower bracket 114 may retain upper and lower ends of the rotatable elements 102*a* and 102*b*, allowing the rotatable elements 102*a* and 102*b* to rotate about their respective axes A-A and B-B. For enhanced rigidity and support of the upper/lower brackets, a pair of vertical support rods 116*a*, 116*b* may be provided that are fixed at upper ends thereof to the upper bracket 112 and at lower ends thereof to the lower bracket 114. Similarly, a rear vertical support rod 118 may be fixed at the upper end thereof to the upper bracket 112, and to the lower bracket 114 at a lower end thereof. As will be described further below, the rear vertical support rod 118 may provide stability and may also provide a support surface for the pans 106 as they are moved downwardly within the space between the upper bracket 112 and the lower bracket 114. More specifically, the pans 106 may rest against the rear vertical support rod 118, as will be described further below.

In addition to supporting the rotatable elements 102, the upper bracket 112, lower bracket 114, vertical support rods 116, and rear vertical support rod 118 also may act as conduit(s) for any electrical signal paths, pneumatic lines, or sensors (not shown). Engravings/etchings may be made into the material to provide additional attachment points for secondary support structures. A geometry/size of the brackets can be altered to accommodate varying configurations of the vertical transport 100 such as to allow different size pans 106, a larger or smaller number of pans 106, etc.

The vertical transport 100 may move the pans 106 containing the dough 120 to a lower or bottom of the vertical transport 100. For example, the rotatable elements may be simultaneously rotated in the same direction, thereby lowering the pans 106. Upon further rotation of the rotatable elements 102, the pans 106 may be dispensed from the support surfaces 104*a* and 104*b*, thereby allowing the pans 106 to be dropped in sequence through the lower bracket 114. In some examples, a transport mechanism (e.g., conveyor belt) may be positioned beneath the vertical transport 100, such that the pans 106 are generally dropped onto the transport mechanism, which will be described in further detail below in other examples.

As noted above, the vertical transport 100 may be used to transport one or more pans 106 vertically up or down. Moreover, the vertical transport 100 may be used to transport other objects. Pans 106 may be manufactured using any material that is convenient (e.g., a metal or other food-safe material) and in any configuration or design that is convenient. In some configurations, the pan 106 may be completely flat to accommodate thin crust doughs 120, while in others the pan may have a raised lip, edge, and/or corners in order to accommodate other types of dough (e.g., deep dish) or other consumable items (e.g., flatbread).

While in this illustrated embodiment a single pizza dough 120 is placed onto the pans 106, e.g., for proofing, in other embodiments one or more other types of consumable items may be placed on the pans 106. Merely as examples, one or more flatbread(s), donut(s), naan, etc. may be placed on each pan 106.

Figure 2A:
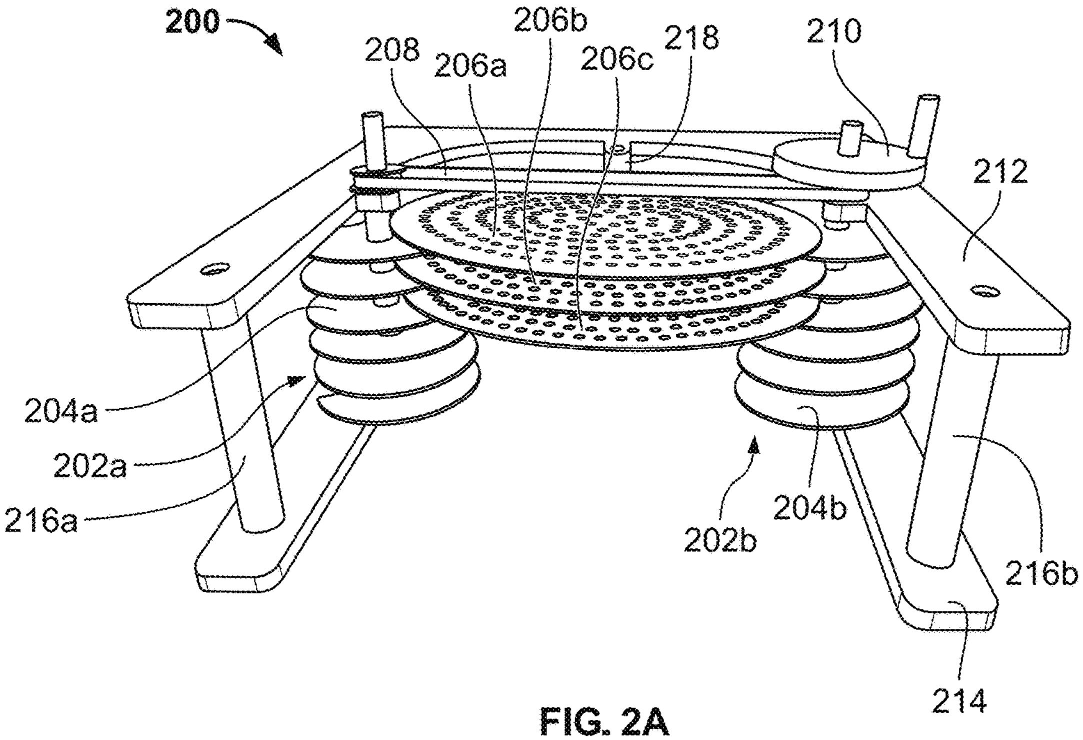
FIG. 2A depicts a perspective view of a vertical transport with three pans positioned upon support surfaces of the vertical transport, in accordance with some embodiments of the disclosure.

Referring now to FIGS. 2A-2E, operation of a vertical transport 200 is illustrated and described. FIG. 2A depicts a vertical transport 200 for generally flat or planar objects 206. The objects 206 may be a pizza pan or any other generally flat-surfaced item. While not illustrated in FIGS. 2A-2E, dough or other bread products may be placed upon the objects 206, e.g., as in the description above regarding vertical transport 100. The objects 206 are able to move downwardly through the vertical transport 200. In an example, vertical transport 200 is vertical transport 100 or otherwise operates in a similar manner as vertical transport 100, with like-numbered components functioning in like fashion. In the example illustrated, vertical transport 200 includes a drive wheel 210 to move a belt 208 in the vertical transport 200, thereby rotating first and second rotatable elements 202*a*, 202*b*. The drive wheel 210 may be driven by a motor or may be manually rotated, and belt 208 may be driven in any other manner that is convenient.

As shown in FIG. 2A, objects 206*a*, 206*b*, and 206*c* (collectively, 206) may initially be placed in the vertical transport 200 in an upper portion of the rotatable elements 202*a* and 202*b*. Accordingly, each of the objects 206 rest upon support surfaces 204*a* and 204*b* of the rotatable elements 202*a* and 202*b*, respectively. Each of the objects 206*a*, 206*b*, and 206*c* may be pizza pans, although any flat object configured to rest upon support surfaces 204*a* and 204*b* of the rotatable elements 202*a* and 202*b*, respectively, may be used. These objects 206 can vary in geometry, design, size, thickness, orientation, and material, and may all be a same configuration or may have different configurations. Further, while three objects 206*a*, 206*b*, and 206*c* are utilized in the vertical transport 200, any number of objects 206 may be stored and/or transported in the vertical transport 200. Initially, the objects 206 are positioned in an end of the rotatable elements 202*a*, 202*b*, and as such are located in an upper portion of the vertical transport 200.

Figure 2B:
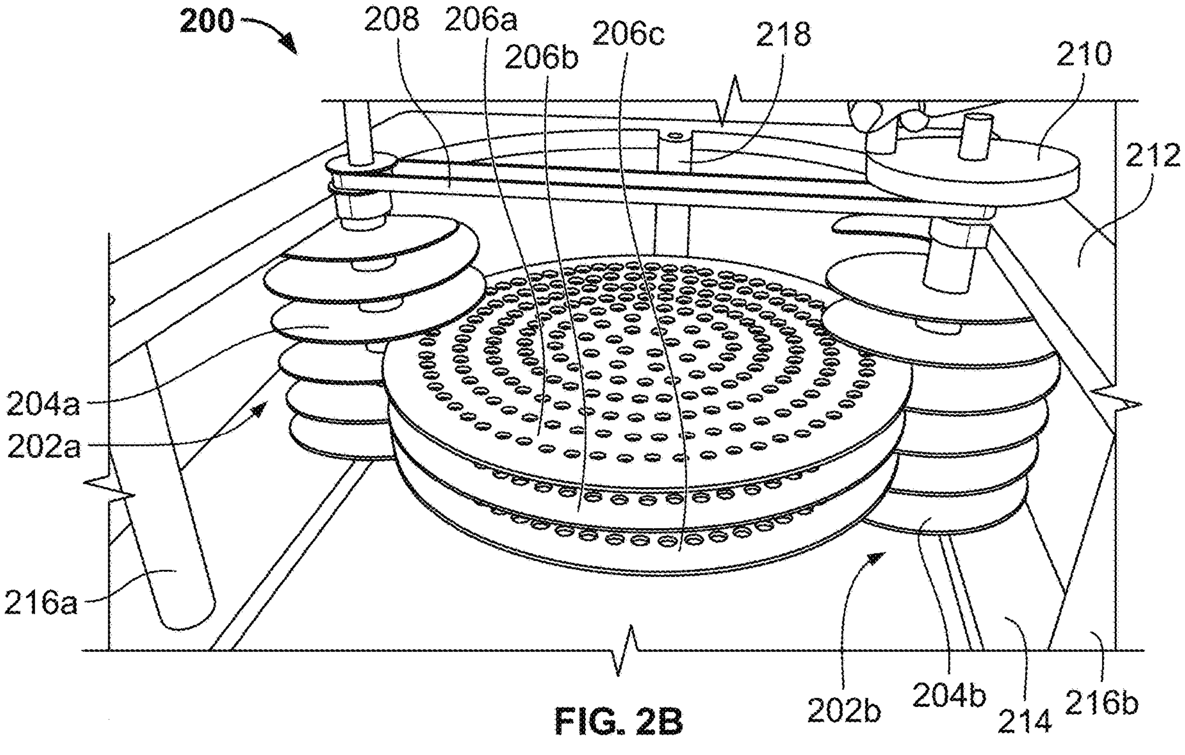
FIG. 2B depicts a perspective view of the vertical transport of FIG. 2A, with the three pans lowered via the transport from the initial position shown in FIG. 2A, in accordance with some embodiments of the disclosure.
Figure 2C:
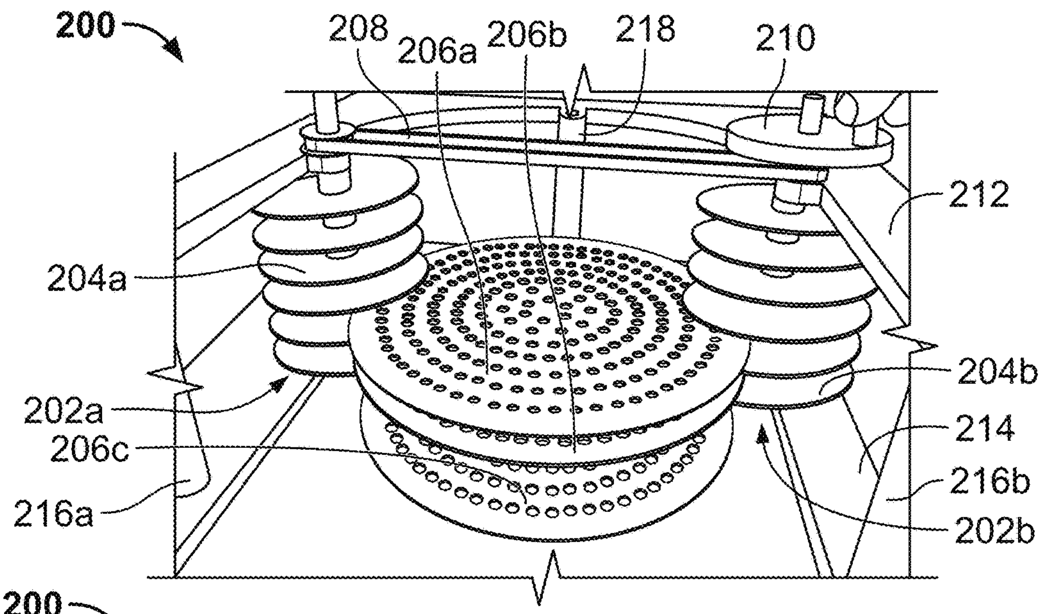
FIG. 2C depicts a perspective view of the vertical transport of FIGS. 2A and 2B, with the three pans further lowered via the transport to release a first one of the pans from the support surfaces, in accordance with some embodiments of the disclosure.
Figure 2D:
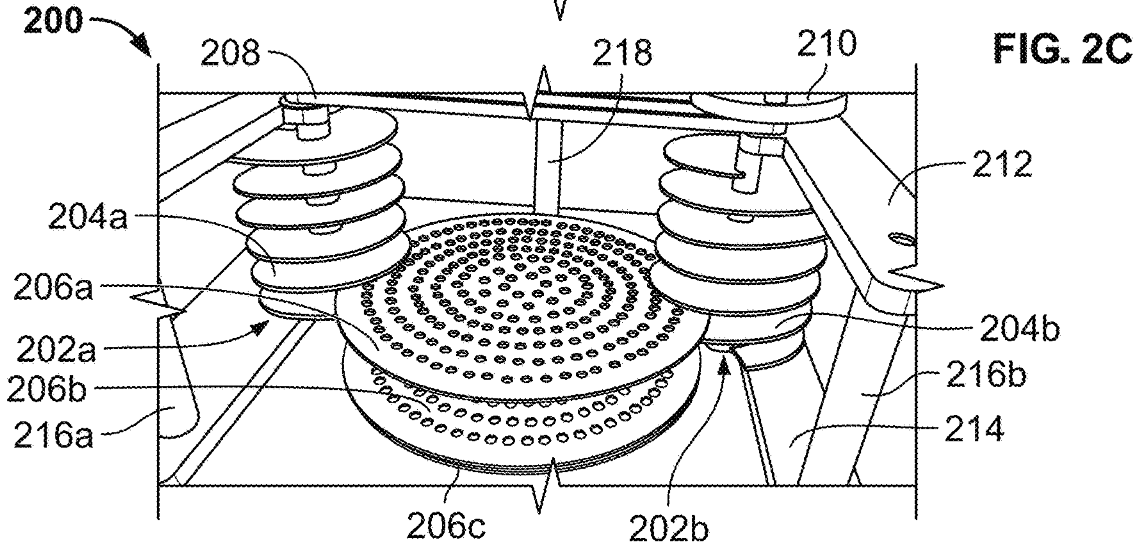
FIG. 2D depicts a perspective view of the vertical transport of FIGS. 2A-2C, with the vertical transport having moved the pans further downward to release a second one of the pans from the support surfaces, in accordance with some embodiments of the disclosure.
Figure 2E:
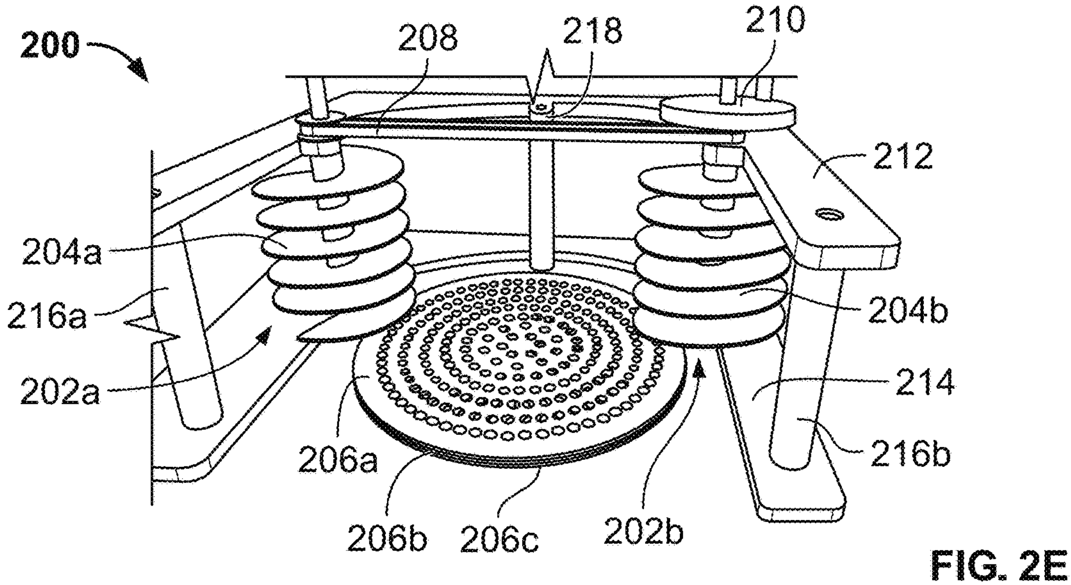
FIG. 2E depicts a perspective view of the vertical transport of FIGS. 2A-2D, with the vertical transport having moved the remaining pan further downward to release the pan from the support surfaces, in accordance with some embodiments of the disclosure.

As seen in FIG. 2B, a rotation of the rotatable elements 202*a*, 202*b* may cause the objects 206 to descend downwardly within the vertical transport 200. More specifically, as the rotatable elements 202*a* and 202*b* turn about their respective axes, the objects 206 each slide relative to the support surfaces 204*a* and 204*b*. In the example illustrated in FIG. 2B, the objects 206 descend downwardly within the vertical transport 200 relative to the initial position shown in FIG. 2A, with each of the objects 206 reaching a lowermost portion of the rotatable elements 202 and the vertical transport 200. Additionally, as seen in FIG. 2C, further rotation of the elements in the same direction may cause the lowermost object 206*c* to be dispensed downwardly out of the vertical transport 200 through a space in the lower bracket 214. Additional rotation of the rotatable elements 202*a*, 202*b* will subsequently dispense object 206*b* (see FIG. 2D), and subsequently object 206*a* (FIG. 2E). While not illustrated in FIGS. 2A-2E, the objects 206 may be dispensed onto a transport mechanism (such as a conveyor belt or a robotic arm) that moves each of the objects 206 laterally away from the vertical transport 200, e.g., to relocate them to a desired destination such as an oven, rack, or storage area.

Figure 2F:
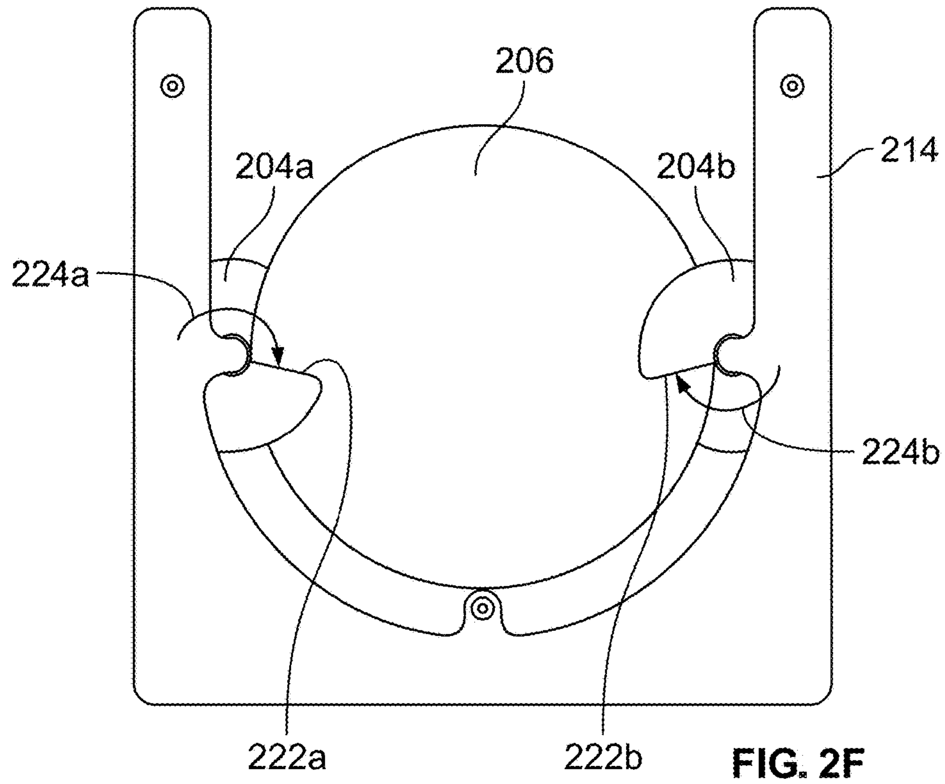
FIG. 2F depicts a bottom view of the vertical transport of FIGS. 2A-2E, illustrating a terminal edge of the support surfaces, in accordance with some embodiments of the disclosure.

Referring now to FIG. 2F, a bottom view of the vertical transport 200 is illustrated to show an object 206 being dispensed from the vertical transport 200. As noted above and illustrated in FIGS. 2A-2E, objects 206 may be dispensed in sequence from the vertical transport 200 by rotating the rotatable elements 202*a* and 202*b*. As seen in FIG. 2F, a lowermost object 206 is positioned at a lower end of the rotatable elements 202*a* and 202*b*. As the rotatable elements 202*a* and 202*b* are rotated, the lowermost object 206 slides along the support surfaces 204*a* and 204*b* until the object 206 reaches a terminal edge 222*a* of the support surface 204*a* and a terminal edge 222*b* of the support surface 204*b*. Further rotation of the rotatable elements 202*a* and 202*b* will, as such, cause the lowermost object 206 to slip off of the support surfaces 204*a* and 204*b*, thereby allowing the object to fall downward from the vertical transport 200. A direction of rotation 224*a* of the first rotatable element 202*a* and a direction of rotation 224*b* of the second rotatable element 202*b* may be in a same direction, e.g., clockwise, as shown in FIG. 2F. Additionally, it may be desirable to coordinate rotation of the rotatable elements 202*a* and 202*b* so that the lowermost object 206 reaches both terminal edges 222*a* and 222*b* simultaneously, or at least in a synchronized manner that allows the object 206 to drop off of both support surfaces 204*a* and 204*b* so that the object 206 falls generally flat (and preventing excess tilt of the object 206, e.g., as may occur if the object were dropped off of one support surface 204 while still supported by the opposite support surface 204). While not shown in the example illustrated in FIG. 2F, a transport mechanism (e.g., conveyor belt, robotic arm, etc.) may be located underneath the vertical transport 200, such that the object 206 is dispensed onto the transport mechanism.

The rotatable elements may be turned at any desired speed that is convenient. In an example, the rotatable elements are turned periodically or relatively slowly, such that each pan is lowered through the enclosure and dispensed only when desired, e.g., after exposure to desired proofing conditions over the course of at least several minutes, and in some cases several hours, in response to an order or other demand, etc. As will be described further below, an enclosure may be maintained at a predetermined temperature, e.g., an elevated temperature in comparison to room temperature. Accordingly, dough positioned on the pan may be proofed by exposure to the predetermined temperature within the enclosure for a predetermined period of time. The system may, as a result, produce proofed pizza dough in an assembly line process, with a single pan being released from the enclosure at predetermined intervals. It should be noted that other example illustrations may use any other temperature range or conditions within an enclosure of the vertical transport 200 that is convenient. Temperatures can in some examples be at or just above room temperature (representing a "warming" environment). In other examples, a relatively cooler temperature may be employed, e.g., temperatures typical of a refrigerator (e.g., where assembled pizzas may be stored until dispensed for baking), or temperatures typical of a freezer (e.g., where a frozen dough is stored until dispensed for assembly of a pizza).

As noted above, rotatable elements 202 and/or support surfaces 204 may define a helical shape, creating a continuous support surface 204 that extends in multiple turns about an axis of rotation of the rotatable element 202, respectively. Objects 206 may thus be smoothly lowered along the vertical transport 200, with the objects 206 remaining in contact with the support surfaces 204*a*, 204*b* of rotatable elements 202*a*, 202*b*, respectively. The support surfaces 204 may extend continuously in multiple turns from an upper end of the rotatable elements 202 to the terminal edge 222, and may thereby facilitate a smooth vertical movement of the objects 206. Furthermore, the continuous surface may facilitate cleaning and/or sterilization with a lack of seams, gaps, or the like in the support surfaces 204 that might otherwise entrap food particles, grease, etc.

Figure 2G:
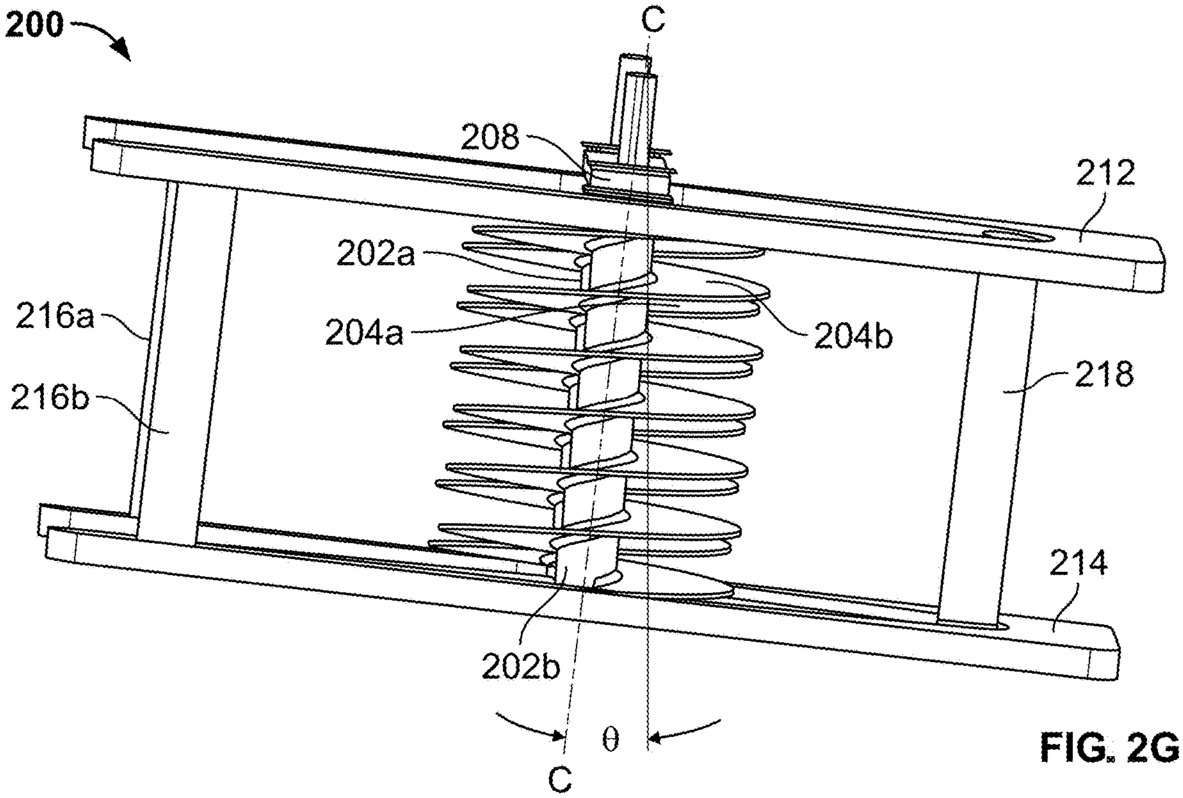
FIG. 2G depicts a side perspective view of the vertical transport of FIGS. 2A-2F illustrating an angled position of the vertical transport, in accordance with some embodiments of the disclosure.

FIG. 2G depicts a lateral view of the exemplary vertical transport 200, in accordance with some embodiments of the present disclosure. As seen in FIG. 2G, the vertical transport 200, and thus the rotatable elements 202*a* and 202*b*, are angled relative to a vertical direction by an angle θ. This tilt as defined by angle θ may generally allow for the objects 206 to rest relatively flat and evenly across both the first support surface 204*a* and the second support surface 204*b*, e.g., to maintain objects 206 in a substantially or generally horizontal orientation. More specifically, to the degree a pitch of the support surfaces 204*a*, 204*b* of the rotatable elements 202*a*, 202*b* causes the objects 206 to be held at a non-perpendicular angle relative to an axis of rotation of the rotatable elements 202*a*, 202*b*, the rotatable elements 202*a*, 202*b* and/or the entire vertical transport 200 may be angled by an offsetting degree, e.g., angle θ, thereby resulting in the pans being substantially horizontal. In an example, the angle θ is approximately 4 degrees, thereby tending to keep objects 206 in contact with rear vertical support 218. A pair of vertical support rods 216*a*, 216*b* may be fixed at upper ends thereof to the upper bracket 212 and at lower ends thereof to the lower bracket 214. Similarly, a rear vertical support rod 218 may be fixed at the upper end thereof to the upper bracket 212, and to the lower bracket 214 at a lower end thereof. Objects 206 (not shown in FIG. 2G) may thereby be stably held at three points. More specifically, objects may be in contact with and supported by the two support surfaces 204*a* and 204*b* of the respective rotatable elements 202*a* and 202*b*, as well as the rear vertical support 218. It should be noted that if the "thread" or pitch of the rotatable elements 202*a* and 202*b* are opposite each other, then a clockwise/counterclockwise direction of rotation of the rotatable element 202*a* must also be opposite a direction of rotation of the rotatable element 202*b* so that rotation causes coordinated raising/lowering of a pan or other object 206 (put another way, were the rotatable elements to have opposite pitch/thread and rotate in the same clockwise/counterclockwise direction, one support surface would raise a pan while the other would lower it).

The numbered elements of FIG. 2G are similar to and function in a similar manner as the components of FIG. 1. It is noted that both the first rotatable element 202*a* and second rotatable element 202*b* are tilted in such a way to create an angle "θ" (about an Axis C). The tilt can be achieved by angling the entire vertical transport 200, angling only select components (e.g., rotatable axes) within the device, or any combination of options. The angle θ may be positive, negative, or zero depending on the embodiment. By altering the angle θ it becomes possible to control the tilt of the first support surface 204*a* and the second support surface 204*b*, along with any and all objects atop them (e.g., maintaining them in a substantially or generally horizontal orientation). In cases where pizza pans are being vertically transported, maintaining a horizontal orientation ensures the pizza pans do not slip, fall, or become damaged during the transport process (or the dispensing process when the pans reach the bottom of the device). In some embodiments, the two axes of the rotatable elements may be tilted at different angles.

The first support surface 204*a*, second support surface 204*b*, the exemplary object 206, and the lower bracket 214 are similar to and function in a similar manner as the components of FIG. 1. When objects 206 are dispensed from the vertical transport 200, they must exit via the terminal edge 222*a* of the first support surface 204*a* and the terminal edge 222*b* of the second support surface 204*b*. When the direction of rotation 224*a* of the first rotatable element 202*a* and the direction of rotation 224*b* of the second rotatable element 202*b* are synchronized, the object 206 is able to be simultaneously released from the terminal edges of both the first and second support surfaces. The object 206 is therefore dispensed from the vertical transport onto a transport mechanism (e.g., conveyor belt) where it can be relocated to another destination (e.g., oven, storage area). Note that by varying the rate and direction of rotation of the two rotatable elements (either independently or simultaneously) it is possible to alter the desired impact on the objects 206 atop of the support surfaces (e.g., maintain a constant vertical position).

While the foregoing examples have been described in the context of a single "stack" of objects 206 or pans being raised/lowered by a pair of rotating elements/helixes 202, in other examples a vertical transport or system may have multiple pairs of rotatable elements 202 to allow multiple perspective "stacks" of objects 206. Merely as one example, different size pizza pans may be dispensed from different respective pairs of rotatable elements 202, e.g., with a first stack corresponding to a 12" diameter pan, another corresponding to a 14" diameter pan, and another corresponding to a 16" diameter pan. Any other size(s) and/or combinations may be employed that are convenient. Further, as noted above a vertical transport may be provided where multiple pairs of rotatable elements 202 are each angled to encourage each of the objects 206 in each stack to remain in contact with a respective rear vertical support 218.

Figure 3A:
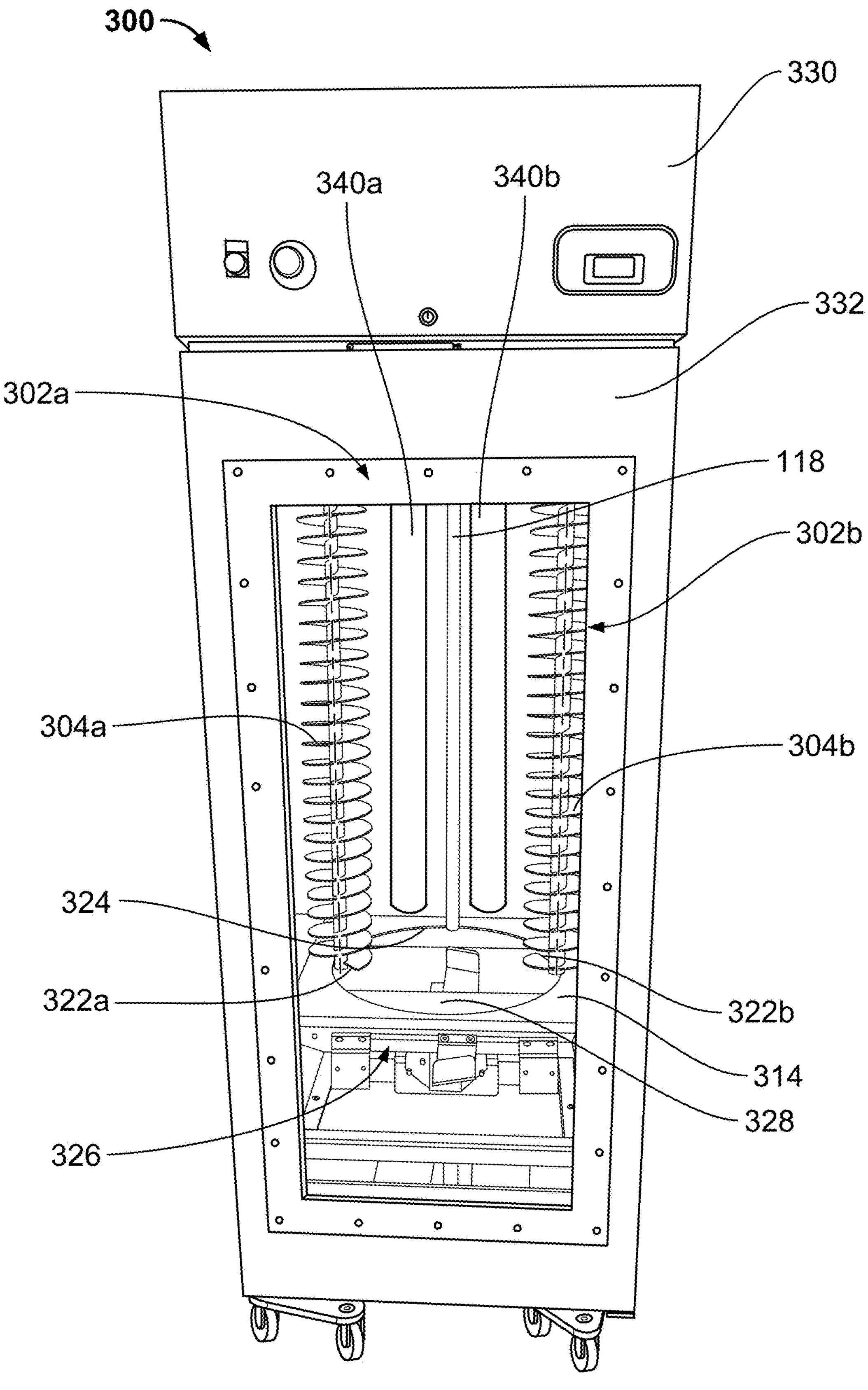
FIG. 3A depicts a front perspective view of a vertical transport system, e.g., for proofing dough, in accordance with some embodiments of the disclosure.

FIG. 3A depicts a dough-proofing cabinet 300 comprising a vertical transport, e.g., vertical transport 100 or vertical transport 200 as described above, within an enclosure 330. Generally, it may be desirable to load a plurality of pans of dough (not shown) within enclosure 330. The dough may be proofed for a period of time within the enclosure 330, e.g., as a result of a controlled environment within the cabinet such as to maintain a desired temperature, humidity, and/or pressure. When a proofed dough is needed, e.g., to load into an automated pizza making system, a dough may be dispensed from the enclosure 330.

Pizza pans or other flat objects (not shown in FIG. 3A) can be loaded into the cabinet by opening an access door 332 on a front side of the enclosure 330 to allow access to the vertical transport within the enclosure 330. Accordingly, pans or other flat objects may be placed onto a first support surface 304*a* of first rotatable element 302*a* and a second support surface 304*b* of a second rotatable element 302*b*. Through the rotation of the rotatable elements 302 (e.g., via a motor and/or belt, not shown) the vertical position of the objects can be changed (e.g., moved downward). In order to dispense the pan from the support surfaces 304, the rotatable elements 302 continue synchronized rotation until the object is at the terminal edge 322*a* of the first support surface 304*a* and the terminal edge 322*b* of the second support surface 304*b*. Further rotation of the rotatable elements 302*a* and 302*b* causes the object to be dropped from the support surfaces 304*a* and 304*b* and dispensed through an aperture 324 defined by the bottom bracket 314. A lateral transport device 326 may be present in a lower region of the enclosure 330. The object may be dropped onto the lateral transport device 326, e.g., for dispensing the pan laterally out of the enclosure. In the illustrated example, the lateral transport device includes a conveyor belt 328 configured to translate the pan/dough out of the enclosure 330, e.g., laterally or orthogonally with respect to a vertical movement of the pans along the rotatable elements 302*a*, 302*b*. As will be discussed further below, pans having pizza dough or other food items on them may be transported away from the enclosure 330 to a storage rack, pizza oven, or other enclosure.

Objects within the proofing cabinet 300 may include pans or other flat objects which may have a pizza dough or other food item positioned thereon for storage within the proofing cabinet 300. Further, as noted above the enclosure 330 may be configured to maintain a desired temperature, humidity, pressure, and/or other conditions that may be desired for storage of the particular food items stored within the enclosure 330. In an example, a relatively warmer temperature than room temperature is maintained within the enclosure 330 to facilitate proofing of pizza doughs positioned on the pans. In another example, a relatively cooler temperature may be employed, e.g., temperatures typical of a refrigerator or of a freezer, to facilitate cold storage of a dough, assembled pizza, or other food item.

Pizza doughs or other food items may be dispensed from the enclosure 330 in response to an order from an automated food system, or in response to a determination that they have been subjected to desired conditions (e.g., temperature, humidity, etc.) for a desired period of time. For example, an automated food system for assembling and baking pizzas that is in communication with the proofing cabinet 300 may determine that one or more of the doughs within the cabinet 300 are fully proofed, and may cause the cabinet to dispense the dough(s) for providing to a pizza assembly system, oven, etc. As discussed above regarding vertical transports 100 and 200, the proofing cabinet 300 may dispense dough or other food items by causing rotation of the rotatable elements 302, allowing a lowermost one of the pans to drop from the support surfaces 304 for dispensing. Accordingly, pizza or other dough positioned on the pan may be proofed by exposure to the predetermined temperature within the enclosure 330 for a predetermined period of time. The system may, as a result, produce proofed pizza dough in an assembly line process, with a single pan being released from the enclosure at predetermined intervals or in response to an order or other request from the automated food system.

Figure 3B:
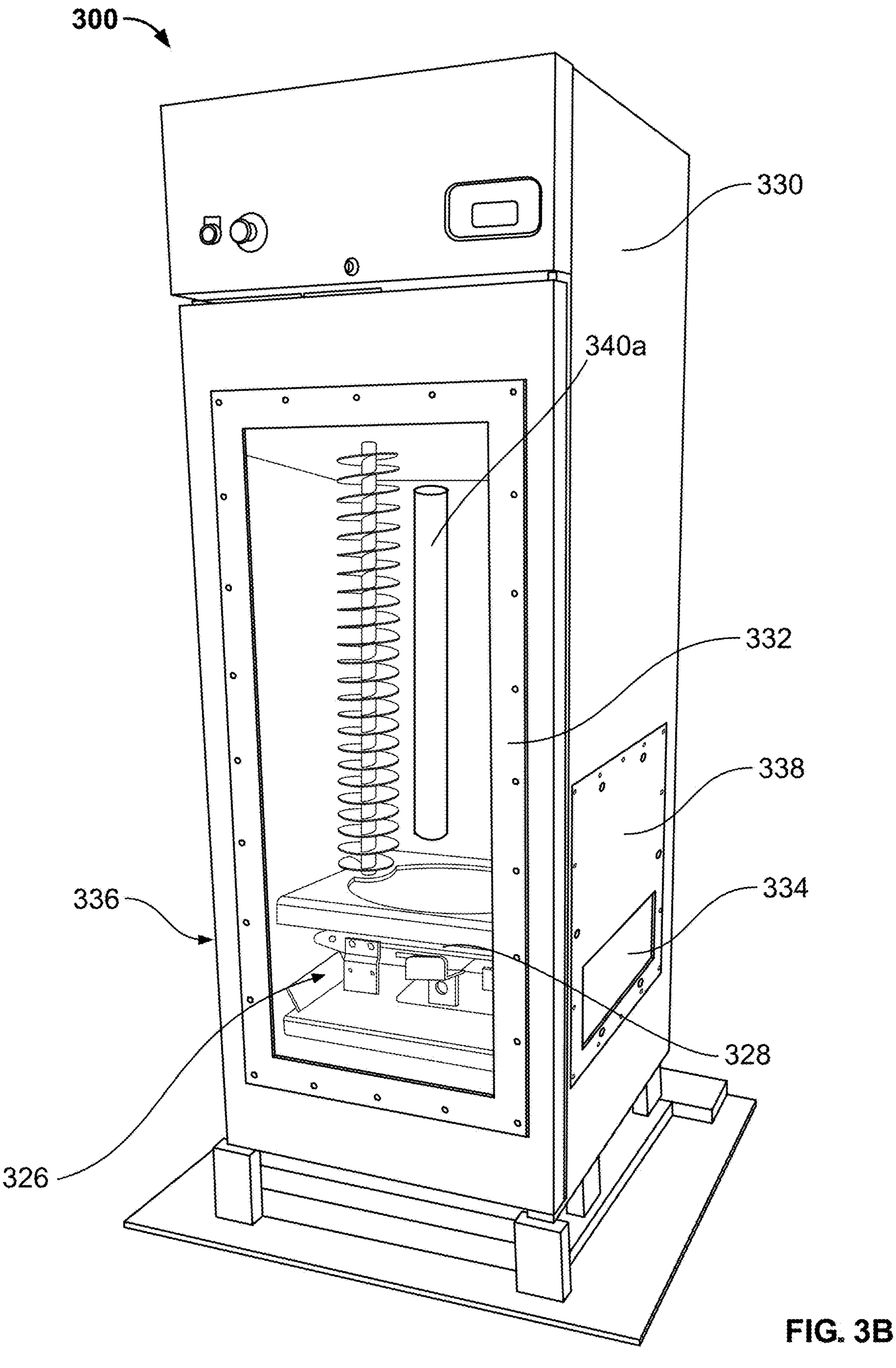
FIG. 3B depicts a side perspective view of the vertical transport system of FIG. 3A, in accordance with some embodiments of the disclosure.

Referring now to FIG. 3B, the proofing cabinet 300 may have a door 334 in a side wall 338 of the enclosure 330 to facilitate exit and/or entry of pans and/or pizza dough on the pans. For example, as noted above pans or other objects may be laterally transported out of the proofing cabinet 300 via conveyor belt 328. Upon dispensation onto the internal conveyor belt 328 of the lateral transport device 326, the belt 328 is actuated to laterally move the object out of the enclosure 330 via the door 334. A similar door 336 may be provided in a side wall (not shown in FIG. 3B) on an opposite side of the enclosure 330 from the door 334, which may also allow entry/exit of pans and/or doughs. As will be discussed further below, pans and/or dough may be transported from the enclosure 330 via door 334 or 336 to another destination (e.g., an oven, storage area, rack, or other cabinet 300).

In accordance with some embodiments, the vertical transport may be engineered as a dough-proofing cabinet 300. The enclosure 330 may be fabricated out of metal or any other suitable material or any combination thereof. It may also contain wheels, casters, etc. to facilitate movement. Some of the walls may contain ports/openings, control panels, windows, doors, or sensors. The sensors may be placed on the exterior and/or within the interior of the enclosure 330 in order to monitor (and control) a variety of parameters (e.g., temperature, humidity, carbon dioxide levels, oxygen levels, convection rates). By controlling these parameters, the functionality and purpose of the cabinet may be altered. In some embodiments it may resemble a fridge/freezer, while in other embodiments it may resemble an oven or storage cabinet.

Access to the dough-proofing cabinet 300 (for loading of objects, maintenance) may be through the front access door 332, which is connected to the exterior walls of the enclosure 330. The door may be attached via a hinge to allow the door to swing open upon pulling a handle attached to the door or it may be a sliding door (horizontally/vertically). The door may contain glass to allow viewing of the internal components/objects or contain sensors for monitoring the status of the door (e.g., open, closed, stuck). The size of the door can be modified in order to accommodate the length of the rotatable elements, the enclosure 330, the size of the objects (e.g., pizza pans) that must be loaded into the interior, or the size of the dough-proofing cabinet 300.

The first rotatable element 302*a*, second rotatable element 302*b*, first support surface 304*a*, second support surface 304*b*, the lower bracket 314, and the rear vertical support rod 318 are similar to and function in a similar manner as the components of FIG. 1. When objects are dispensed from the vertical transport, they must exit via the terminal edge 322*a* of the first support surface 304*a* and the terminal edge 322*b* of the second support surface 304*b*. When the direction of rotation for both rotatable elements are synchronized, the object is able to be simultaneously released from the terminal edges of both the first and second support surfaces. The object is therefore dispensed from the vertical transport through the aperture 324 onto the lateral transport device 326. The size, geometry, and configuration of the aperture is defined in large part by the lower bracket 314. Bigger apertures may be fabricated to allow for the dispensation of larger objects by widening the dimension of the lower bracket 314. Note that sensors may be placed along the edges of the aperture to monitor a variety of quality control parameters (e.g., dispensation rate). Furthermore, one or more sensors may be provided for detecting a presence, location, and/or number of pans positioned on the rotatable elements 302a, 302b. Merely by way of example, optical sensor(s) positioned within the enclosure 330 and distributed vertically and/or along a length of rotatable element(s) 302 may be configured to determine a position of pan(s) that are currently held by the support surfaces 304. Further, such sensors may determine a number of pan(s) present within the enclosure 330, doughs ready for dispensing, etc.

The lateral transport device 326 is located at the bottom of the vertical transport and at the lowermost portion of the cabinet's interior. The device's mechanism of action can vary depending on the configuration of not only the device, but also the cabinet. In some embodiments, as illustrated in FIG. 3A, the mechanism of action may be a conveyor belt 328, while in other embodiments it may be a moving platform (e.g., robotic arm). Affixed to the top of the lateral transport device 326, the conveyor belt 328 serves to laterally move the objects that are dispensed onto it to a different location outside of the cabinet (e.g., oven, another cabinet). In some cases the conveyor belt 328 may be one large continuous belt where the object must run through multiple cabinets, or even rooms, before it reaches its final destination.

The conveyor belt 328 may move the object laterally out either of the doors 336 or 334. Furthermore, the conveyor belt 328 may also transport objects such as pans or doughs through the enclosure 330 via the conveyor belt 328. For example, as will be discussed further below example systems may have multiple enclosures positioned together, in which it may be desirable to dispense a pan/dough from one enclosure 330 and transport the pan/dough through another enclosure 330. The doors 334 and 336 may be any configuration that is convenient. In the example illustrated in FIG. 3B, the exterior wall 338 is generally stationary, and the door 334 moves downward (or upward) to allow exit/entry of a food item or pan. The doors 334 and 336 can have a suitable size and/or shape to accommodate the size of various objects (e.g., pizza pans, doughs, bread, etc.) that are desired to transport into/out of the enclosure 330. The doors 334 and 336 may each be operated automatically (e.g., sensors control the opening/closing of the doors 334/336 based on a detected presence of an object such as a pan or dough in proximity to it, an instruction from an automated food system, etc.). Alternatively, the doors 334 and/or 336 may be actuated manually. While the doors 334 and 336 can be used for transporting objects out of the cabinet, they can also be used to transport objects into and/or through the cabinet (e.g., objects entering from adjacent cabinets), as note above. Depending on the configuration and functionality of the embodiment, the doors may operate independently or even simultaneously.

The cabinet 300 may be provided with one or more controllers or processors and/or other electronics to facilitate proofing of pizza dough, storage, or other desired functions. In an example, lighting may be provided to communicate a status of the cabinet 300 and/or contents of food items within the enclosure 330. Merely as examples, a normal operation may be indicated by white lighting within the enclosure 330, which is visible from the outside by a user through the front access door 332, which may be transparent or have windows or the like for observing contents of the enclosure 330. Additionally, a stop condition or fault may be indicated by a different color lighting, e.g., red lighting.

As in the examples noted above, one or more cleaning or sterilizing devices may be positioned within enclosure 330, e.g., adjacent rotatable elements 302 or other components having food-contacting surfaces. For example, as shown in FIGS. 3A and 3B one or more ultra-violet (UV) lights 340a, 340b (collectively, 340) may be positioned within the enclosure 330, each extending along the rotatable element(s) 302. The UV light(s) 340 may be configured to sterilize support surfaces 304 and/or other desired areas within the enclosure 330 by activation of UV lighting during periods of non-use.

Figure 4:
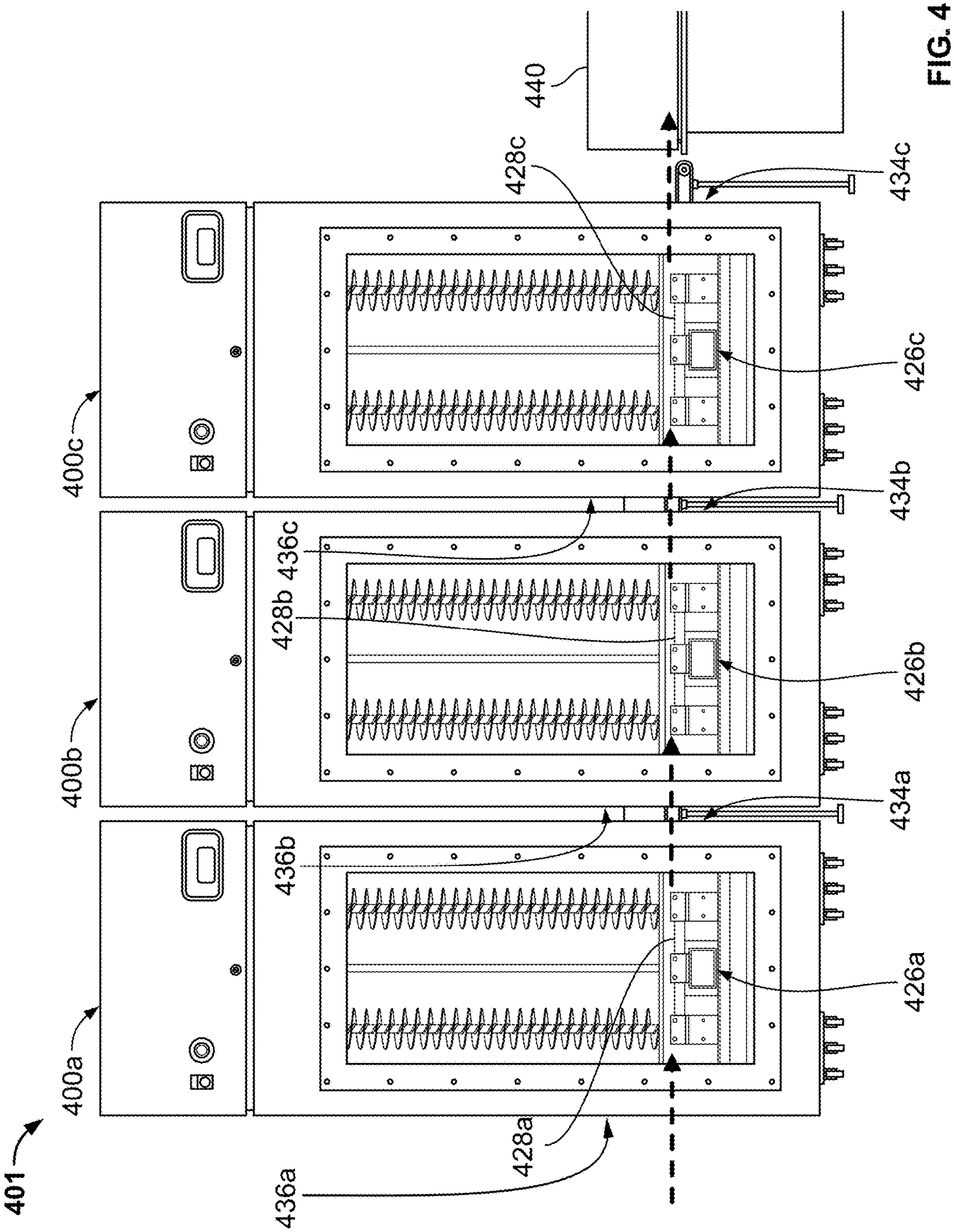
FIG. 4 depicts a front perspective view of a vertical transport system, e.g., for proofing dough, having a plurality of vertical transports, in accordance with some embodiments of the disclosure.

As noted above, doors 334 and 336 may be provided on opposite sides of a proofing cabinet to facilitate entry into and/or exit from the enclosure 330 of pans, pizza dough, or other food items. Referring now to FIG. 4, an example proofing and storage system 401 is illustrated comprising multiple cabinets 400a, 400b, and 400c (collectively, 400) that are placed immediately adjacent each other. In this manner, pans containing pizza doughs may be transported between the cabinets 400. In an example, a pan containing a dough may be transported from the left-most cabinet 400a and into the middle cabinet 400b, and subsequently from the middle cabinet 400b to the right-most cabinet 400c. Subsequently, the pan/dough may be dispensed from the proofing and storage system 401 to an oven 440 for baking. Accordingly, a pan containing a pizza dough or other food item(s) may be dispensed from any of the proofing cabinets. While three cabinets 400 are illustrated in this example, the proofing and storage system 401 is generally modular and any number of cabinets 400 may be utilized to provide a desired capacity for pans/doughs to be stored and/or dispensed.

In an example, each of the cabinets 400 is proofing cabinet 300, as described above in FIGS. 3A and 3B. In the example system 401, the multiple cabinets 400 may be utilized in order to increase storage and/or output capacity as noted above. More specifically, the cabinets 400 are closely positioned next to each other to facilitate objects being dispensed from and transported through each cabinet. For example, a pan having one or more doughs can be dispensed from cabinet 400a on a conveyor belt 428a of a lateral transport 426a. The pan can be transported through the right-side door 434a of cabinet 400a, and may enter the adjacent cabinet 400b via the left side door 436b thereof. Accordingly, the pan may be transported to the conveyor belt 428b of a lateral transport 426b of the cabinet 400b. Subsequently, the pan may be transported via the conveyor belt 428b of lateral transport 426b out of the cabinet 400b and into the adjacent cabinet 400c via the doors 434b and 436c. Further, the pan may be transported via the conveyor belt 428c of lateral transport 426c out of the cabinet 400c via the door 434c and into an oven 440 for baking. Alternatively, the pan/dough may be transported to a storage rack, pizza assembly device for application of sauce, cheese, and/or other toppings, or to an additional transport mechanism. The doors 434 and 436 and conveyor belts 428 of each cabinet 400 may generally facilitate a simplified transport of objects (e.g., pizza pans) through the cabinets 400 and to the oven 440 or other destination. Furthermore, doors 434 and/or 436 may also facilitate loading of specialty food items. Merely as one example, where a specialty item (e.g., a gluten-free pizza dough) not stored in bulk within cabinets 400a, 400b, and/or 400c is desired or ordered, a pan having the specialty item may be manually loaded by way of door 436a into the cabinet 400a, and passed through the cabinets 400a, 400b, and 400c to the oven 440, a pizza assembly station, or other desired destination. Accordingly, the system 401 may facilitate providing specialty items that are not stored in larger numbers in cabinets 400a, 400b, and 400c.

While the example storage and proofing system 401 is illustrated in FIG. 4 as having a single group, array, or row of adjacent cabinets 400, an additional group of cabinets may be provided such that the system 401 include multiple groups of cabinets 400 functioning independently of one another. Further, while the illustrated example employs generally identical cabinets 300, in other examples the system 401 may employ cabinets having different heights, functions, temperatures, etc. Accordingly, it is not required for the cabinets to be identical within the same array (e.g., varying cabinet height, function, temperature).

Figure 5:
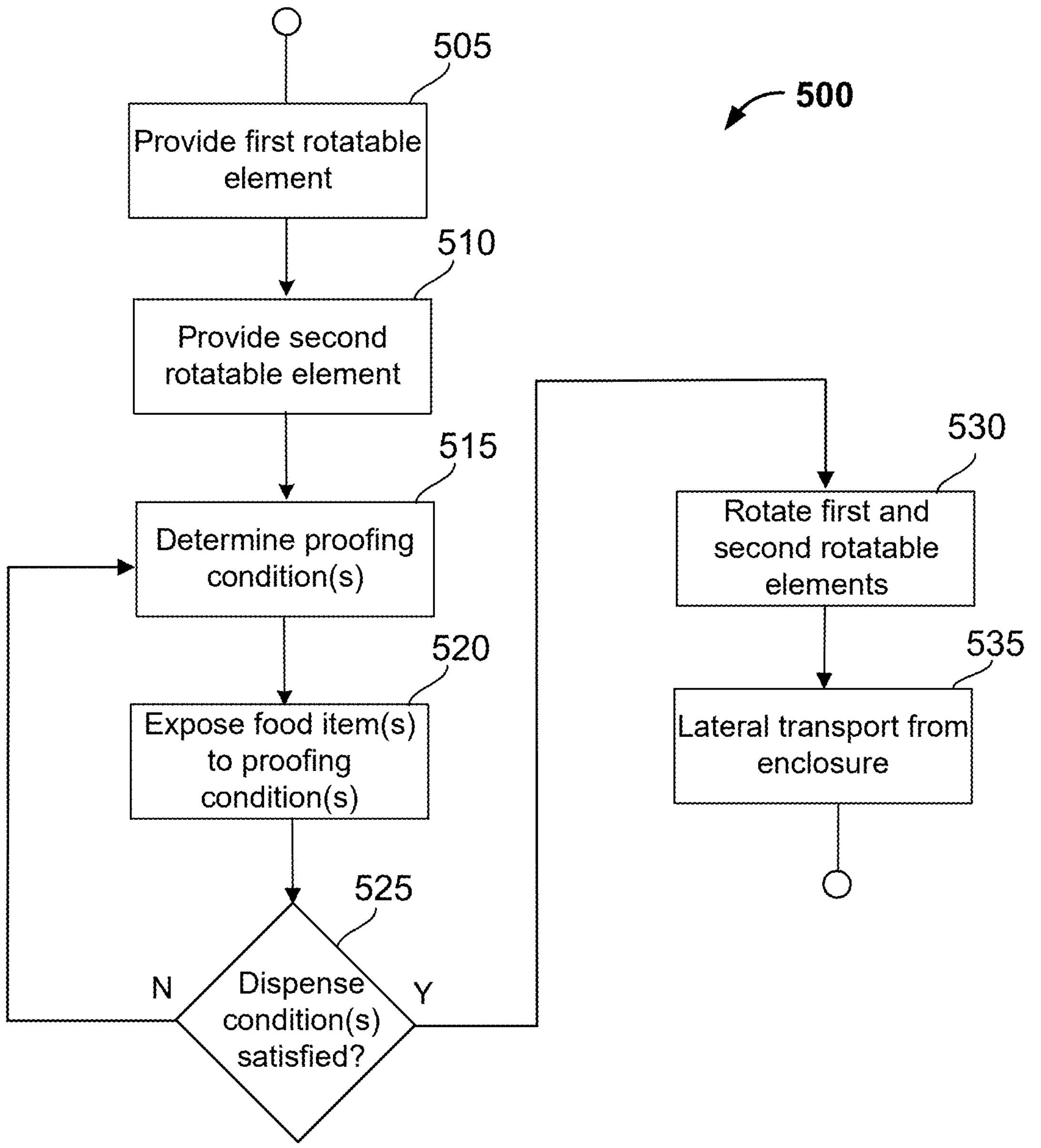
FIG. 5 is a flow chart representing an illustrative method of transporting dough, in accordance with some embodiments of the disclosure.

Referring now to FIG. 5, an example process 500 of transporting dough, e.g., through a proofing enclosure via a vertical transport, is illustrated and described in further detail. Process 500 may begin at block 505, where a first rotatable element is provided. For example, as noted above rotatable element 202, 302, or 402 may be provided having a support surface or pan support surface 404 extending about an axis. Proceeding to block 510, a second rotatable element may be provided, e.g., having a respective second support surface or pan support surface extending about a second axis [[ ]]. The rotatable elements may be rotatably supported within a vertical transport such that the first and second axis are spaced apart. Further, the axes of rotation may be parallel to each other. Process 500 may then proceed to block 515.

At block 515, one or more proofing conditions may be determined, e.g., by a controller of an automated food system. For example, a controller associated with a pizza assembly and baking system may determine a temperature for an enclosure in which the rotatable elements are positioned to effect proofing of a pizza dough positioned on pan(s) supported on the rotatable elements. Furthermore, an exposure time for the pizza dough to effect proofing at the temperature may be determined. Accordingly, the controller may determine whether/when one or more pizza doughs stored in a proofing cabinet is ready for dispensing.

Proceeding to block 520, one or more food items may be exposed to one or more predetermined conditions for a predetermined period of time. For example, as noted above enclosure 330 may be configured to maintain a predetermined temperature, humidity, or other condition in order to promote proofing of pizza doughs stored within the enclosure 330. Food items may be manually loaded into a proofing cabinet, e.g., proofing cabinet 300. In other example systems, loading may be automated, e.g., with conveyors, robotic arms, or the like. Process 500 may then proceed to block 525.

At block 525, process 500 may query whether one or more dispense conditions associated with a food item are satisfied. For example, an automated food system may determine whether one or more pizza doughs have been exposed to a predetermined temperature, e.g., above room-temperature, for a long enough time that the dough(s) are proofed or otherwise prepared for assembly of toppings, baking, etc. In other examples, automated system may receive orders for pizza and/or dough, and in response may dispense one or more pizza doughs to facilitate assembly or baking of pizza(s) to satisfy the order. When one or more dispense conditions are not satisfied, process 500 may proceed back to block 515 to determine appropriate proofing conditions. Accordingly, process 500 may loop through blocks 515-525 until one or more dispense conditions are met. Process 500 may then proceed to block 530.

At block 530, process 500 may cause rotation of the first and second rotatable elements, thereby moving a pan engaged with the first and second pan support surfaces through the enclosure and dispensing the pan from the enclosure. Proceeding to block 535, process 500 may transport one or more pans from the enclosure. For example, as noted above in some examples a conveyor 328 or 428 or a robotic arm may be provided that is configured to transport a pan containing one or more doughs from a proofing cabinet 300 or 400 to a destination such as a pizza topping assembly, oven, or storage rack. Furthermore, in some examples multiple conveyors 428 of corresponding multiple cabinets 400 may be employed to transport a pizza dough to a desired location.

The foregoing is merely illustrative of the principles of this disclosure and various modifications may be made by those skilled in the art without departing from the scope of this disclosure. The embodiments described herein are provided for purposes of illustration and not of limitation. Thus, this disclosure is not limited to the explicitly disclosed systems, devices, apparatuses, components, and methods, and instead includes variations to and modifications thereof, which are within the spirit of the attached claims.

The systems, devices, apparatuses, components, and methods described herein may be modified or varied to optimize the systems, devices, apparatuses, components, and methods. Moreover, it will be understood that the systems, devices, apparatuses, components, and methods may have many applications. The disclosed subject matter should not be limited to any single embodiment described herein, but rather should be construed according to the claims.

What is claimed is:

1. A system for proofing dough, comprising:

a first rotatable element having a first support surface extending about a first axis;

a second rotatable element having a second support surface extending about a second axis spaced from the first axis, wherein the first and second rotatable elements are configured to move a pan engaged with the first and second support surfaces by rotating the first and second rotatable elements, wherein the first rotatable element and the second rotatable element are configured to synchronize a release of the pan from the first support surface and the second support surface such that the pan drops from the first and second support surfaces;

a first cabinet having a temperature-controlled enclosure containing the first rotatable element and second rotatable element, wherein the first cabinet is configured to proof dough on the pan by maintaining a predetermined temperature, thereby exposing the dough to the predetermined temperature within the enclosure for a predetermined period of time;

a first conveyor belt configured to translate the pan out of the enclosure, the first conveyor belt positioned such that the pan drops from the first and second support surfaces to the first conveyor belt;

a second cabinet adjacent the first cabinet;

a second conveyor belt in the second cabinet and adjacent to the first conveyor belt, wherein the first and second conveyor belts are configured to transport the pan from the first cabinet to the second cabinet.

2. The system of claim 1, wherein the first rotatable element comprises a first helix defining the first support surface, and wherein the second rotatable element comprises a second helix defining the second support surface.

3. The system of claim 1, wherein the first support surface of the first rotatable element extends continuously in multiple turns around the first axis to a terminal edge of the first rotatable element.

4. The system of claim 1, further comprising a motor configured to rotate one of the first and second rotatable elements.

5. The system of claim 1, wherein the first and second rotatable elements are configured to lower the pan through the enclosure by rotating the first and second rotatable elements.

6. The system of claim 1, further comprising a door adjacent the first conveyor belt.

7. The system of claim 1, further comprising a force translating component configured to couple rotation of the first rotatable element to the second rotatable element.

8. The system of claim 1, wherein the first cabinet comprises access doors configured to open to allow loading a plurality of pans onto the first and second support surfaces.

9. A vertical transport, comprising:

a first cabinet;

a first rotatable element located in the first cabinet and having a first support surface extending about a first axis;

a second rotatable element located in the first cabinet and having a second support surface extending about a second axis spaced from the first axis;

wherein the first and second rotatable elements are configured to move a pan engaged with the first and second support surfaces in a vertical direction by rotating the first and second rotatable elements;

a second cabinet adjacent the first cabinet; and a conveyor configured to receive the pan from the first and second rotatable elements and transfer the pan from the first cabinet to the second cabinet.

10. The vertical transport of claim 9, wherein the first rotatable element comprises a first helix defining the first support surface, and wherein the second rotatable element comprises a second helix defining the second support surface.

11. The vertical transport of claim 9, wherein the first support surface of the first rotatable element extends continuously in multiple turns around the first axis to a terminal edge of the first rotatable element.

12. The vertical transport of claim 9, wherein the first rotatable element and the second rotatable element are configured to rotate in a same direction.

13. The vertical transport of claim 9, wherein the first cabinet forms a temperature-controlled enclosure containing the first rotatable element and the second rotatable element, wherein the vertical transport is configured to proof a dough on the pan by maintaining a predetermined temperature, thereby exposing the dough to the predetermined temperature within the enclosure for a predetermined period of time.

14. The vertical transport of claim 13, wherein the first and second rotatable elements are configured to lower the pan through the enclosure by rotating the first and second rotatable elements.

15. The vertical transport of claim 9, wherein the first rotatable element and the second rotatable element are configured to synchronize a release of the pan from the first support surface and the second support surface such that the pan drops from the first and second support surfaces.

16. The vertical transport of claim 15, further comprising a conveyor belt within the first cabinet and configured to translate the pan laterally, the conveyor belt positioned such that the pan drops from the first and second support surfaces to the conveyor belt.

17. A method for transporting dough through a proofing enclosure, comprising:

providing a first rotatable element and a second rotatable element located in a first cabinet, wherein the first rotatable element includes a first pan support surface extending about a first axis, wherein the second rotatable element includes a second pan support surface extending about a second axis spaced from the first axis;

rotating the first and second rotatable elements, thereby moving a pan engaged with the first and second pan support surfaces through the proofing enclosure in a vertical direction;

synchronizing a release of the pan from the first pan support surface and the second pan support surface such that the pan drops from the first and second pan support surfaces to a conveyor;

receiving the pan from the first and second rotatable elements with the conveyor; and transferring the pan from the first cabinet to a second cabinet adjacent the first cabinet using the conveyor.

* * * * *